March 10, 1931. L. P. CROSMAN Re. 17,992
SPRING TESTING AND ASSORTING MACHINE
Original Filed Feb. 23, 1928 4 Sheets-Sheet 1
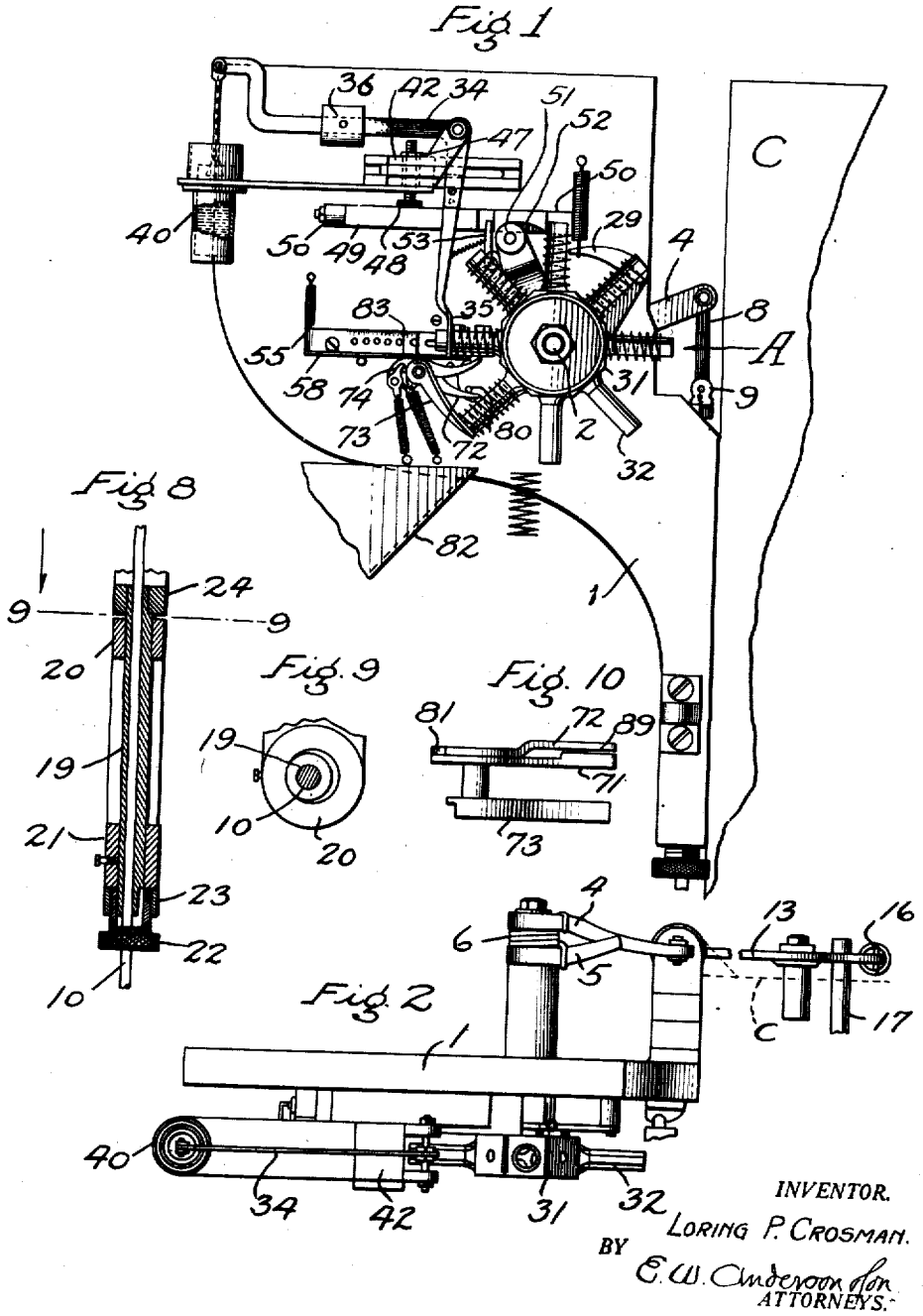
INVENTOR.
LORING P. CROSMAN.
BY E. W. Anderson & Son
ATTORNEYS.

March 10, 1931. L. P. CROSMAN Re. 17,992
SPRING TESTING AND ASSORTING MACHINE
Original Filed Feb. 23, 1928 4 Sheets-Sheet 2
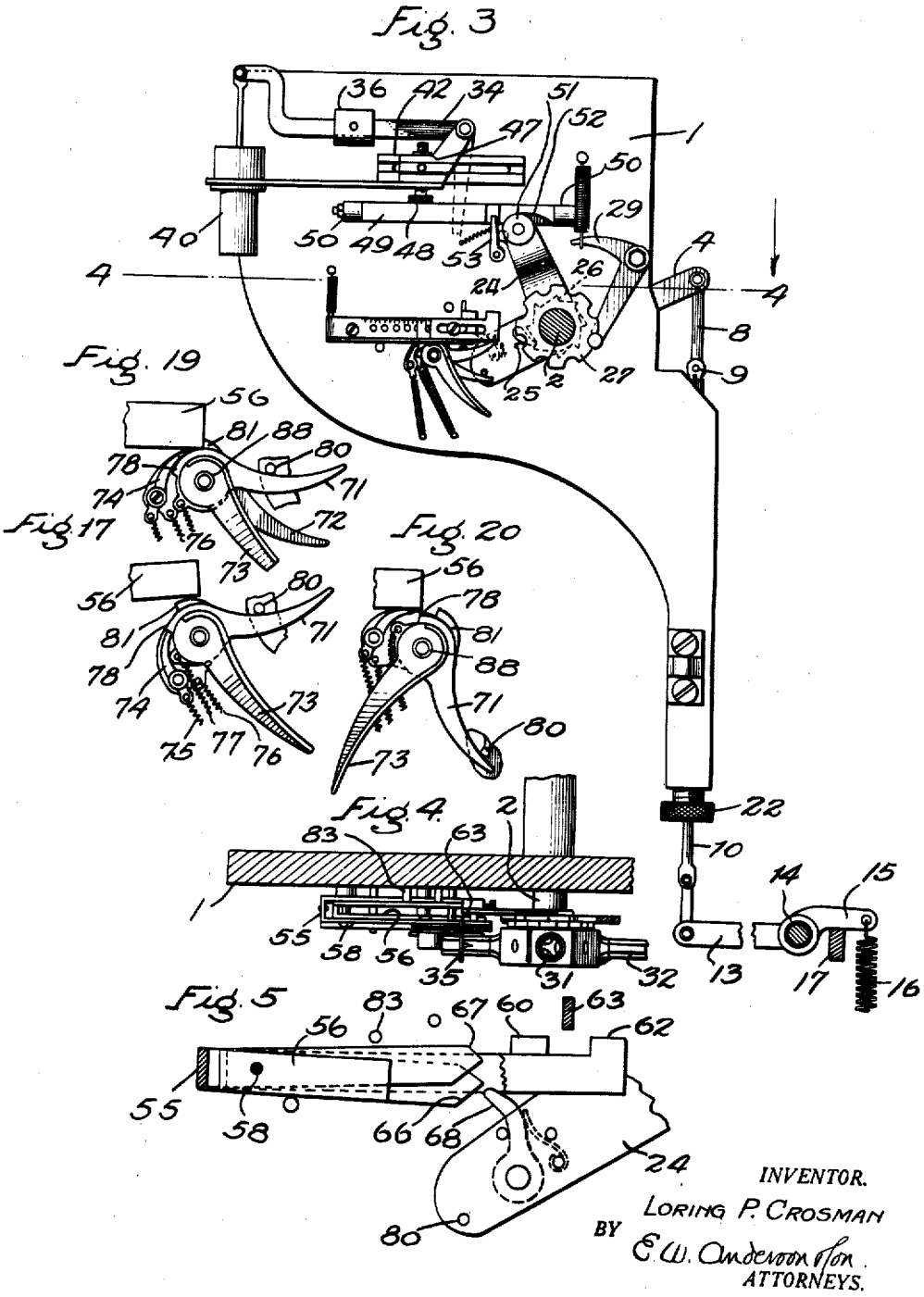
INVENTOR.
LORING P. CROSMAN
BY E. W. Anderson & Son
ATTORNEYS.

March 10, 1931. L. P. CROSMAN Re. 17,992
SPRING TESTING AND ASSORTING MACHINE
Original Filed Feb. 23, 1928 4 Sheets-Sheet 3
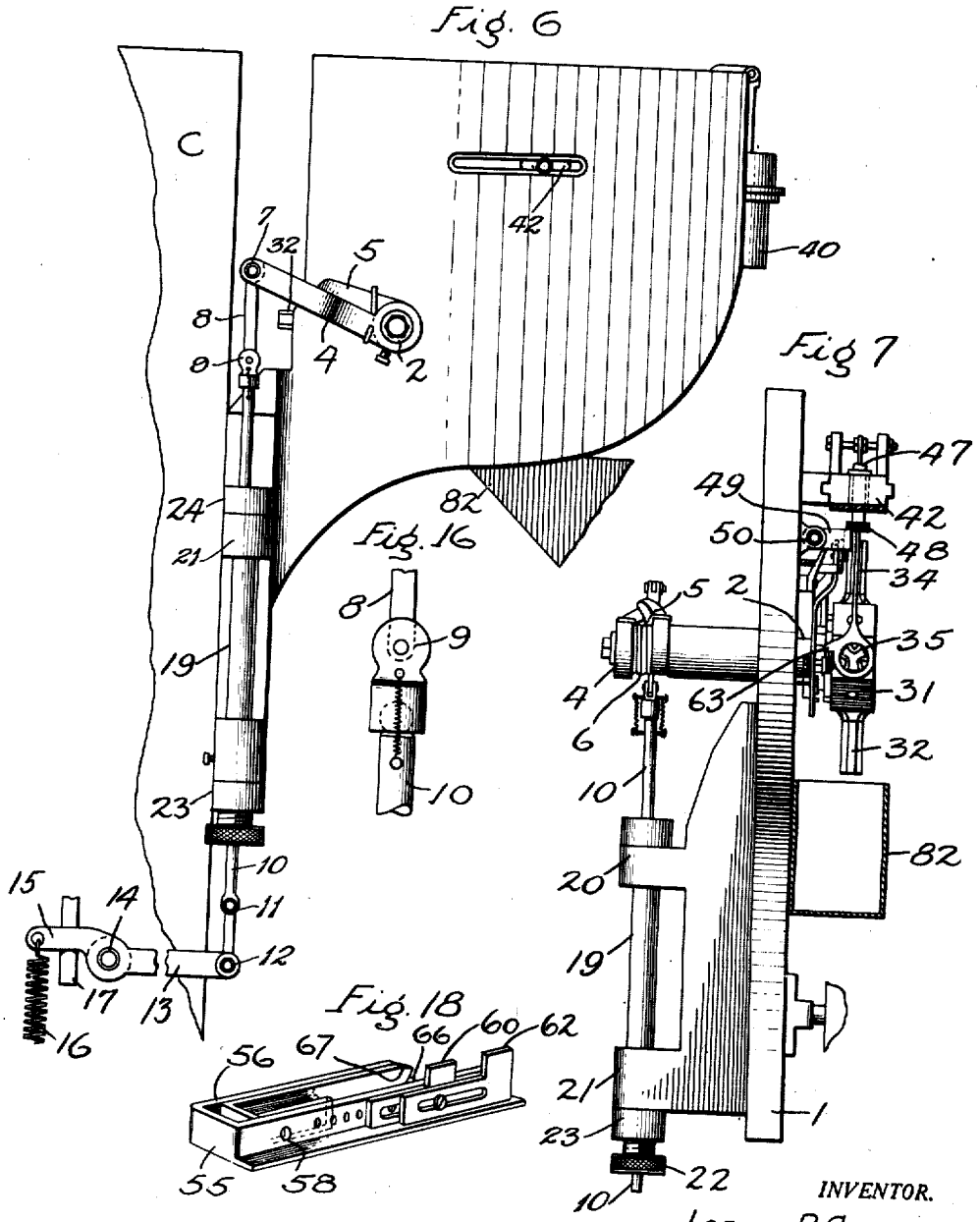
INVENTOR.
LORING P. CROSMAN.
BY E. W. Anderson & Son
ATTORNEYS.

March 10, 1931. L. P. CROSMAN Re. 17,992
SPRING TESTING AND ASSORTING MACHINE
Original Filed Feb. 23, 1928 4 Sheets-Sheet 4
Fig. 11
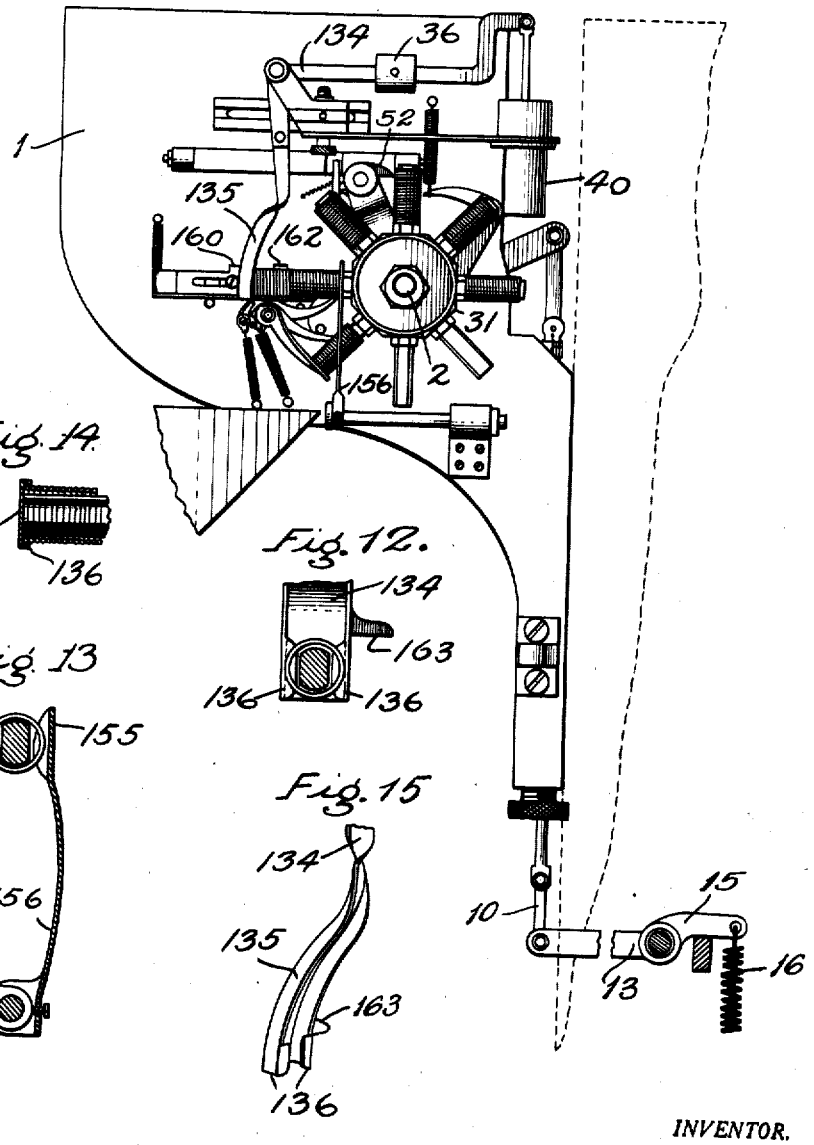
Fig. 14.
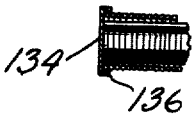
Fig. 12.
Fig. 13
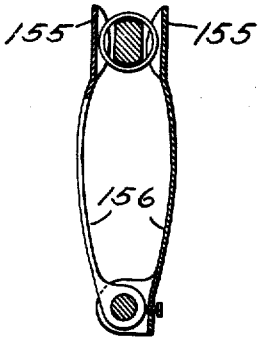
Fig. 15
INVENTOR.
LORING P. CROSMAN.
BY E. W. Anderson & Son
ATTORNEYS.

Reissued Mar. 10, 1931

Re. 17,992

UNITED STATES PATENT OFFICE

LORING P. CROSMAN, OF MAPLEWOOD, NEW JERSEY, ASSIGNOR TO MONROE CALCULATING MACHINE COMPANY, INC., OF ORANGE, NEW JERSEY, A CORPORATION OF DELAWARE

SPRING TESTING AND ASSORTING MACHINE

Original No. 1,713,690, dated May 21, 1929, Serial No. 256,272, filed February 23, 1928. Application for reissue filed April 12, 1930. Serial No. 443,898.

This invention relates to spring testing and assorting machines, and more particularly to devices for automatically comparing the tensile or compressive strength of coil springs with a standard.

The invention comprises essentially a member upon which the spring being compared is carried, a member adapted to engage the spring, and mechanism operable to urge one of said members in a direction to oppose the resistance of the spring by a force dependent upon the pre-determined standard. Other mechanisms are provided whereby automatic feeding, discharging, and sorting of the spring is secured.

The invention consists in the novel construction and combination of parts, as set forth in the appended claims.

In the accompanying drawings illustrating the invention:

Figure 1 is an elevation of the apparatus;

Fig. 2 is a plan view of the same;

Fig. 3 is a view similar to Fig. 1, with parts broken away;

Fig. 4 is a cross section, taken on line 4—4 of Fig. 3;

Fig. 5 is a detail of the gate controlling mechanism;

Fig. 6 is a rear elevation of the apparatus;

Fig. 7 is a side view of the same;

Fig. 8 is a detail cross section of the means for adjustably mounting the apparatus on a spring-making machine;

Fig. 9 is a cross section, taken on the line 9—9 of Fig. 8;

Fig. 10 is a detail plan view of the gate mechanism;

Fig. 11 is a front elevation of the device as adapted for the testing of tension springs;

Fig. 12 is a detail view showing the extremity of an arm of the balancing lever illustrated in Fig. 11;

Fig. 13 is a detail cross sectional view of a gripping fork;

Fig. 14 is a detail view showing the manner in which a tension spring is engaged by the arm shown in Fig. 12;

Fig. 15 is a perspective view of the testing arm shown in Fig. 11;

Fig. 16 is a detail view showing the swivel mounting of links in the actuating mechanism;

Fig. 17 is a detail side view of the gate mechanism, with the parts in the preliminary position taken for the ejection of a faulty spring;

Fig. 18 is a perspective view of the gate latch control members;

Fig. 19 is a view similar to Fig. 17, with the parts in normal position;

Fig. 20 is a similar view, with the parts in the final position taken in the ejection of a faulty spring.

Referring to the drawings, Figs. 1 and 2, a drive shaft 2 is journaled in a sleeve of the supporting plate 1. Shaft 2 is designed to have an oscillatory movement, this being secured preferably by operating connections with the cutting mechanism of a spring making machine, whereby the movements of the testing and sorting devices may be co-ordinated with the movements of the spring making machine and an automatic feed secured.

As shown, this operating connection comprises an arm 5, fast with shaft 2 and normally held in contact with an arm 4, loose upon said shaft, by spring 6. A link 8 is pivoted to the arm 4, and at its other end has pivotal connection with a head 9, provided with a universal joint connection with a link 10 (see Fig. 16). Link 10 is connected, by means of a short link, to a lever 13, fulcrumed at 14 upon the frame of the spring-making machine and having a spring 16 attached to its free arm 15. 17 represents the element of the spring-making machine employed to transmit power to the testing device, such element engaging the arm 15 and imparting thereto a reciprocatory movement.

The oscillatory movement of shaft 2, is employed to impart a feeding movement to the spring-carrying members, so that the springs may be brought into testing position, by means of a bell crank 24 (Fig. 3) fixed to shaft 2 and carrying a spring pawl 25, engaging a ratchet wheel 26, rotatably mounted on shaft 2. Fast upon ratchet wheel 26 is a detent wheel 27, having peripheral recesses equal in number to the teeth in the ratchet wheel, said recesses being engaged by a spring detent device 29. Fast with ratchet wheel 26 and detent wheel 27, is a hub 31, carrying radial pins or projections 32, equal in number to the teeth of the ratchet wheel and constituting a spring carrier. Springs to be tested are fed from the spring-making machine C, or otherwise at the point A (Fig. 1), and the intermittent rotation of the spring carrier by the ratchet mechanism will advance the springs from position A to a position diametrically opposite thereto, at which point the spring will be engaged by the contact member of the testing device.

In order that the position of the testing device may be adjusted relatively to the point A of the spring-making machine, the plate 1 is secured to the frame of machine C by lugs 20, 21 of said frame and 23, 24 of the machine. A sleeve 19, having an eccentric bearing in lugs 20, 21 is designed to provide for lateral adjustment, and a set screw 22 threaded into lug 23 to provide for vertical adjustment of the parts. Link 10 of the actuating mechanism works through the aperture of sleeve 19. The spring is compressed by the testing device as follows:

A block 42, adjustably secured in the plate 1, is provided with a fulcrum bearing for balancing lever 34, the lower arm of which has an annular extremity 35 adapted to slide freely over the radial projections 32. The horizontal arm of lever 34 carries the weight 36, which may be adjusted thereupon to vary the moment of force about the fulcrum, and thus vary the standard of comparison by which the springs are to be tested. A dash pot 40 is employed to control the movement of the balancing lever.

Loosely positioned in an aperture in the block 42 is an internally threaded sleeve 47, accommodating a set screw 48, which is adjustable to limit the downward movement of the horizontal arm of lever 34. The head of set screw 48 rests upon a plate 49, pivotally mounted upon lugs 50 of plate 1. Plate 49 is normally held in raised position against the pressure of weight 36, by a pivoted catch 53, in which position the arcuate extremity 35 of lever 34 is held out of the path of movement of the projections 32. As a projection 32 is advanced into testing position, a lug upon bell crank 24 will strike the catch 53 and move the same into register with a notch of plate 49, whereupon said plate will be allowed to fall and release lever 34, bringing the annular portion 35 thereof into register with projection 32 and compressing the spring carried thereon.

In the return movement of bell crank 24, a roller 51 mounted thereon will engage with a cam face 52 of plate 49 and raise the same sufficiently to allow catch 53 to spring back to supporting position, thereby operating lever 34, raising weight 36 and disengaging the annular extremity 35 of lever 34, from projection 32.

Spring which meet the standard with which they are being compared will be compressed by lever 34 to a given extent, and lever 34, when compressing such spring, will stand in a given position. Means are provided whereby lever 34 will, according to its position, control a discharging device, so that springs which correspond to the standard, within any desired tolerance, will be discharged in one place, and springs which do not meet such standard, will be discharged in a different place, thus enabling the separation of faulty springs from perfect ones.

For this purpose, a U-shaped assorting member 55 is pivoted at 58 upon plate 1, said member carrying laterally adjustable lugs 60, 62, lying beneath the path of movement of projection 63 of lever 34. These two lugs are separately adjustable and are designed to be spaced from each other by an interval corresponding to the desired tolerance. If the spring being tested does not come within the tolerance, projection 63 will lie over one of the lugs 60 or 62, and will thereby prevent pivotal movement of the assorting member 55.

Mounted within the bend of member 55 is a U-shaped gate latch 56, pivoted at 58 and having latching engagement at the end of its shorter arm with a shoulder 81 of a finger 72, said finger controlling a gate member 73, in the manner presently to be described. A pawl 68 is mounted on the lower arm of bell crank 24, and in the clockwise movement of said bell crank, the pawl will engage a double beveled or pointed end 66 of the member 55. If projection 63 lies between the lugs 60 and 62, the upward movement of pawl 68 will raise member 55 until the pointed end 66 overlies a similarly pointed end 67 of gate latch 56, whereupon member 55 will encounter stop pin 83 and pawl 68 will cam over the projections 66 and 67 without moving the latter.

If, however, the spring being tested does not correspond with the standard, projection 63 will lie over lug 60 or lug 62, in which case member 55 will be prevented from rising and pawl 68 will snap over projection 66, engage projection 67 and raise gate latch 56, releasing finger 72 from latching position.

Finger 72, pivoted at 88, will be drawn upwardly by a spring 76 when released from the gate latch, and a pawl 74, mounted on said finger, will fall behind a shoulder 78 of a second finger 71. Finger 71 is rigidly connected with gate member 73, these parts being pivoted at 88 and held in upward position by a spring 77. Normally, gate member 73 lies beneath the path of movement of the springs carried by the projections 32, so that such springs as correspond with a standard, are carried beyond member 73 before being discharged.

When, however, a faulty spring has caused the tripping of gate latch 56, finger 72 will rise into the path of movement of a pin 80 on bell crank 24 and, upon downward movement of the bell crank, finger 72, will be carried downward, moving therewith finger 71 into a position in which an offset portion 89 thereof will also come into the path of movement of pin 80. Parts 71, 72, and 73 will now be moved downwardly as a unit, pawl 74 being pulled out of engagement with shoulder 78 by the pawl spring 75, and gate member 73 moving away from the projections 32 sufficiently to allow the faulty spring to be discharged at a different point from the point of discharge of the perfect spring. A receptacle or chute 82, is illustrated as lying in position to catch the faulty springs and separate the same from the perfect springs.

Upon the next upward movement of bell crank 24, the parts 71, 72, and 73 will be restored by their springs to normal position, with finger 72 in engagement with the gate latch 56 and the gate member 73 in position for discharging perfect springs.

When it is desired to test the strength of tension springs, the balancing lever is reversed, so that the weight 36, dash pot 40, and the horizontal arm of lever 134 are positioned to the right of the pivot (Fig. 11). The vertical arm of the balancing lever 134 has a curved portion 135 concentric with the shaft 2 when the arm lies in normal position, said curved portion terminating in the pair of knife blades 136 adapted to engage between the outer end coils of the spring as it is brought into testing position. The inner end coils of the spring are engaged by the blades 155 carried on bowed arms 156. The arm of lever 134 is also provided with a lug 163 (similar to lug 63) adapted to cooperate with lugs 160 and 162 for the purpose described in connection with the testing of compression springs. After the spring has been compared, further counter clockwise rotation of the spring carrier causes the spring to be disengaged from the knife edges 136 and 155, and passed between the bowed arms 156 to discharging position.

The foregoing disclosure is to be regarded as illustrative only, as the invention may be embodied in modified forms without departing from the scope of the invention.

I claim:

1. In a device for comparing coiled springs with a predetermined standard, a member having a plurality of pins upon which springs may be fed, means for intermittently actuating said member, a lever having an extremity adapted to engage a spring upon one of said pins, and means for selectively discharging the springs from engagement with said pins.

2. A device for comparing the strength of coiled springs with a predetermined standard, comprising a member having a plurality of pins upon which springs may be fed, means for intermittently rotating said member in one direction, means for preventing the reverse rotation of said member, a lever having an extremity adapted to be moved into engagement with a spring on one of said pins, means for urging the lever in the opposite direction, and means for selectively discharging the springs from engagement with said pins.

3. A device for comparing the strength of coiled springs with a predetermined standard, said device comprising a shaft, a bell crank fixed to said shaft, a ratchet wheel rotatably mounted on the shaft, a pawl on said bell crank adapted to engage the teeth of the ratchet wheel to cause rotation in one direction, a member having a plurality of equally spaced radial projections upon which springs may be fed, said member being interconnected with said ratchet wheel to move therewith, a lever pivoted adjacent said member and having a horizontal arm upon which a weight is adjustably mounted, said lever having a vertical arm adapted to engage a spring on one of said projections.

4. In a device for comparing the strength of coiled springs with a predetermined standard, a base plate, a grooved plate fixed to said base plate, a flanged block slidable in said grooved plate, a lever pivotally supported by the block, said lever having a horizontal arm upon which a weight is adjustably positioned and a vertical arm having an extremity adapted to engage a coiled spring being compared.

5. In a machine for comparing the strength of coiled springs with a predetermined standard, means for feeding the springs, and a device for separating faulty springs from those which meet the standard requirements, said device comprising a gate lever adapted to serve as a guide for springs of the last mentioned type, and means to move the lever to non-guiding position when the spring is stronger or weaker than said standard.

6. In a device for comparing the strength of a coiled spring with a predetermined standard, a member having a projection upon which the spring to be compared is carried, a lever having a work arm adapted for direct contact with the spring being compared, and means to urge the lever in a direction to oppose the resistance of said spring, said last mentioned means being adjustable so that the force urging the lever will be dependent upon the predetermined standard.

7. In a device for comparing the strength of a spring with a predetermined standard, a spring carrier, means for advancing said carrier, a guide member adapted to prevent the ejection from the carrier of springs which meet the standard requirements until said spring has been moved to a predetermined position, and means to move said guide member to a different position so that faulty springs may be ejected before said predetermined position has been reached.

8. In a device for comparing coiled springs with a predetermined standard, a shaft, means to oscillate the shaft, a member rotatably mounted on the shaft and having a plurality of projections upon which springs may be fed, a ratchet fixed to the member, a pawl mounted on the shaft, said pawl engaging the ratchet to intermittently rotate the member, and a member adapted to engage a spring upon one of said projections.

9. In a device for comparing coiled springs with a predetermined standard, a member having a pin upon which a spring to be compared may be carried, a two-armed lever, one arm of the lever having an extremity adapted for direct contact with a spring on the pin, the other arm of the lever being acted upon by a force urging the lever to rotate in one direction, and means to intermittently force the lever to rotate in the opposite direction.

10. A device for comparing the strength of coiled springs with a predetermined standard, comprising a member having a pin upon which springs may be fed, a lever having an extremity adapted to be moved into direct contact with a spring on the pin, and means for intermittently urging the lever against the spring.

11. In a device for comparing the strength of coiled springs, a rotatable carrier mounted on a horizontal axis, radial spring carrying projections thereon, a member adapted to engage a spring upon one of said projections, and means for rotating the carrier to advance the springs from feeding toward testing position.

12. In a device for comparing the strength of springs with a predetermined standard, a testing member adapted to contact with the springs, and automatic assorting means including a power driven feeler member adapted to contact with the testing member to determine the degree to which the spring has yielded.

13. In a device for comparing the strength of springs with a predetermined standard, a testing member adapted to contact with the springs, and automatic assorting means including a power-driven feeler member adapted to contact with the testing member, and variable discharge control devices controlled by said feeler member.

14. In a device for comparing the strength of springs with a predetermined standard, a testing member adapted to contact with the springs, and automatic assorting means including a two-position discharge member, and means for moving said member from normal into its second position in discharging a spring stronger or weaker than said standard.

Signed at Orange in the county of Essex and State of New Jersey, this 21st day of March, 1930.

LORING P. CROSMAN.

CERTIFICATE OF CORRECTION.

Reissue Patent No. 17,992. Granted March 10, 1931, to

LORING P. CROSMAN.

It is hereby certified that the assignee in the above numbered patent was erroneously described and specified as "Monroe Calculating Machine Company, Inc., of Orange, N. J., a corporation of Delaware", whereas said assignee should have been described and specified as Monroe Calculating Machine Company, of Orange, N. J., a corporation of Delaware, as shown by the records of assignments in this office; and that the said Letters Patent should be read with this correction therein that the same may conform to the record of the case in the Patent Office.

Signed and sealed this 14th day of April, A. D. 1931.

(Seal)

M. J. Moore,
Acting Commissioner of Patents.